US009069648B2

(12) United States Patent
Jones et al.

(10) Patent No.: US 9,069,648 B2
(45) Date of Patent: Jun. 30, 2015

(54) SYSTEMS AND METHODS FOR DELIVERING ACTIVITY BASED SUGGESTIVE (ABS) MESSAGES

(76) Inventors: Martin Kelly Jones, Vancouver (CA); Scott Andrew Horstemeyer, Atlanta, GA (US)

( * ) Notice: Subject to any disclaimer, the term of this patent is extended or adjusted under 35 U.S.C. 154(b) by 392 days.

(21) Appl. No.: 13/358,173

(22) Filed: Jan. 25, 2012

(65) Prior Publication Data
US 2013/0188809 A1 Jul. 25, 2013

(51) Int. Cl.
| H04B 1/00 | (2006.01) |
| G06F 17/00 | (2006.01) |
| G06Q 10/00 | (2012.01) |
| G09B 19/00 | (2006.01) |
| G09B 5/06 | (2006.01) |
| A63B 24/00 | (2006.01) |

(52) U.S. Cl.
CPC ........ *G06F 17/00* (2013.01); *H04B 1/00* (2013.01); *G06Q 10/00* (2013.01); *G09B 19/00* (2013.01); *G09B 5/06* (2013.01); *A63B 24/00* (2013.01)

(58) Field of Classification Search
CPC .......... G06Q 10/00; G09B 19/00; G09B 5/06; H04B 1/00; G06F 17/00; G06F 1/163; G06F 19/3481; A63B 24/00
USPC ............... 381/119; 369/19; 600/300; 348/77; 709/205; 455/414.1, 345, 414.3; 340/539.26; 700/91, 94; 482/8
See application file for complete search history.

(56) References Cited

U.S. PATENT DOCUMENTS

| 5,442,553 | A * | 8/1995 | Parrillo ............... 455/420 |
| 6,754,485 | B1 * | 6/2004 | Obradovich et al. ...... 455/414.1 |
| 7,508,298 | B2 * | 3/2009 | Pisz et al. ............... 340/436 |
| 7,872,574 | B2 * | 1/2011 | Betts et al. ........... 340/539.26 |
| 2003/0058752 | A1 * | 3/2003 | Birnbach et al. ............ 369/19 |
| 2004/0133081 | A1 * | 7/2004 | Teller et al. ............... 600/300 |
| 2004/0152957 | A1 * | 8/2004 | Stivoric et al. ............ 600/300 |
| 2007/0117557 | A1 * | 5/2007 | Adjali et al. ............... 455/418 |
| 2008/0090703 | A1 * | 4/2008 | Rosenberg .................... 482/8 |
| 2009/0144369 | A1 * | 6/2009 | Brown ........................ 709/205 |
| 2009/0215502 | A1 * | 8/2009 | Griffin, Jr. ................ 455/569.1 |
| 2011/0009241 | A1 * | 1/2011 | Lane et al. ..................... 482/8 |
| 2011/0231478 | A1 * | 9/2011 | Wheeler et al. ............ 709/203 |
| 2012/0253485 | A1 * | 10/2012 | Weast et al. .................. 700/91 |
| 2013/0184843 | A1 * | 7/2013 | Ellis et al. ..................... 700/94 |
| 2013/0190903 | A1 * | 7/2013 | Balakrishnan et al. ........ 700/91 |
| 2014/0039840 | A1 * | 2/2014 | Yuen et al. ................... 702/189 |
| 2014/0221774 | A1 * | 8/2014 | Teller et al. .................. 600/301 |

OTHER PUBLICATIONS

Pioneer, DVD Multimedia AV Navigation Server AVIC-D3 (operation manual), Mar. 2006, pdf, pertinent pages.*
Pioneer,DVD Multimedia AV Navigation Server AVIC-D3 (operation manual), Mar. 2006, pdf, whole document.*

* cited by examiner

*Primary Examiner* — Vivian Chin
*Assistant Examiner* — Ubachukwu Odunukwe
(74) *Attorney, Agent, or Firm* — Thomas | Horstemeyer, LLP

(57) ABSTRACT

A personal electronic device (PED) is provided with a system for delivering activity based suggestive (ABS) messages (e.g., a motivational message, etc.) to a user based upon the current or anticipated activity of the user. In some embodiments, the user can define user preferences, which determine when and how ABS messages are initiated. In some embodiments, the message selection is based upon a detected activity, location, or speed of the user. In some embodiments, the message selection is based upon a detection of a local environmental event.

28 Claims, 5 Drawing Sheets

SYSTEMS AND METHODS FOR DELIVERING ACTIVITY BASED SUGGESTIVE (ABS) MESSAGES

BACKGROUND OF THE INVENTION

1. Field of the Invention

The present invention relates to systems and methods for providing suggestive messages to a user based upon an activity the user is or is about to be engaged in, and more particularly, to systems and methods for delivering real time activity based suggestive (ABS) messages (e.g., motivational messages, etc.) to users by way of personal electronic devices (PEDs), such as a wireless telephone, smartphone, MP3 player, radio, etc.

2. Description of the Related Art

It is well known that human beings are by their very nature capable of achieving great things when possessed of the right state of mind or the ability to react to circumstances while engaged in certain activities, such as sports. For example, professional athletes often engage in mind-based exercises in which they are instructed to envision success relative to particular endeavor or event. Olympic downhill skiers are often trained to mentally prepare for a sporting event by first learning a mountain course and then rehearsing their performance relative to that that course in their minds. As such, success or failure often will be attributed to one's mental strength relative to a particular field of endeavor.

Take sales personnel, for example. Companies and organizations have long believed that the power of positive thinking is often the key to sales success. Each year organizations spend significant resources internally and for outside professional coaching services by recognized experts to mentally prepare sales personnel and to produce "winners"—sales people that are mentally prepared to realize a relatively greater number of sales and gains.

While many skeptics have said that positive thinking and sales and other performance success are merely coincidences, the power of positive thinking cannot be underestimated as a tool that everyday people can and should use to better their lives. For example, many people endlessly (and unnecessarily) seek the advice and care of medical practitioners often to "fix" problems that can be solved through simple positive thinking. We have all heard the stories of cancer patients that have long outlived prognoses for short life expectancies as a result of familial support and simple positive thinking wherein one can convince oneself that he or she can truly overcome particular obstacles and live stronger and healthier.

Despite the benefits that have long been attributed to positive thinking, there remain no truly effective way of delivering coaching and other messages to people outside of requiring people to read books by gurus, attend seminars, and the like. Aside from horoscopes and machines that may deliver the same such as in vending and entertainment machine contexts, there remains no effective way for people to receive suggestive and other motivational type coaching messages that are easily obtained and perceived.

U.S. patent application 2003/0058752 filed by Bimbach et al., which is incorporated herein by reference, describes an apparatus and method for delivering psycho-suggestive messages in a PED. However, this apparatus is very rudimentary and not user friendly.

Thus, there exists a need to provide new and improved systems and methods that facilitate user friendly delivery of ABS messages that people can obtain to aid them in thinking more positively about their personnel challenges and about their personal circumstances.

SUMMARY OF THE INVENTION

The present invention provides systems and methods for delivering one or more activity based suggestive (ABS) messages (e.g., motivational messages, etc.) to a user by way of a personal electronic device (PED), for example but not limited to, a radio, a wireless telephone, a smartphone, a personal electronic game, a media player (e.g., CD, DVD, MP3), etc.

One embodiment, among others, is a method for implementing in a PED that has a media player. The method comprises the steps of enabling a user to input one or more user preferences, playing media (audio, video, images, etc.), and initiating output of one or more ABS messages based upon the user preferences. An embodiment of a related system has a computer-based architecture and computer software that is stored in memory and executed by one or more processors for performing the foregoing steps. Yet another embodiment of a related system can be implemented in software and/or hardware and has a means for performing each of the aforementioned steps.

Another embodiment is a method for implementing in a PED that has an media player. The method comprises the steps of enabling a user to input one or more user preferences, determining a user activity associated with the user, playing media, and initiating output of one or more ABS messages based at least in part upon the user preferences and the user activity. An embodiment of a related system has a computer architecture and computer software that is stored in memory and executed by one or more processors for performing the foregoing steps. Yet another embodiment of a related system can be implemented in software and/or hardware and has a means for performing each of the aforementioned steps.

Another embodiment is a method for implementing in a PED having one or more audio outputs. The method comprises the steps of: (a) enabling a user to perform a first electronic based intelligence function; (b) enabling the user to perform a second electronic based intelligence function, comprising: (1) enabling the user to input one or more user preferences that will cause the PED to play in the future one or more ABS messages; and (2) initiating output of the one or more ABS messages based upon the user preferences to the one or more audio outputs. An embodiment of a related system has a computer-based architecture and computer software that is stored in memory and executed by one or more processors for performing the foregoing steps. Yet another embodiment of a related system can be implemented in software and/or hardware and has a means for performing each of the aforementioned steps.

Another embodiment is a method for implementing in a PED having one or more audio outputs, a GPS receiver, and map data. The method comprises the steps of: (a) enabling a user to perform a first electronic based intelligence function; (b) enabling the user to perform a second electronic based intelligence function, comprising: (1) receiving location information from the GPS receiver; (2) determining an activity based upon the location information and the map data; and (3) initiating output of the one or more ABS messages based upon the activity to the one or more audio outputs. An embodiment of a related system has a computer-based architecture and computer software that is stored in memory and executed by one or more processors for performing the foregoing steps. Yet another embodiment of a related system can be implemented in software and/or hardware and has a means for performing each of the aforementioned steps.

Another embodiment is a method for implementing in a PED having one or more outputs. The method comprises the steps of: sensing a signal in a local environment associated with the PED; converting the sensed signal to sensed data; detecting an event by comparing the sensed data with reference data that corresponds to the event; and initiating output of the one or more ABS messages based upon the detected event to the one or more outputs. An embodiment of a related system has a computer-based architecture and computer software that is stored in memory and executed by one or more processors for performing the foregoing steps. Yet another embodiment of a related system can be implemented in software and/or hardware and has a means for performing each of the aforementioned steps.

Other systems, methods, apparatus, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWING FIGURES

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
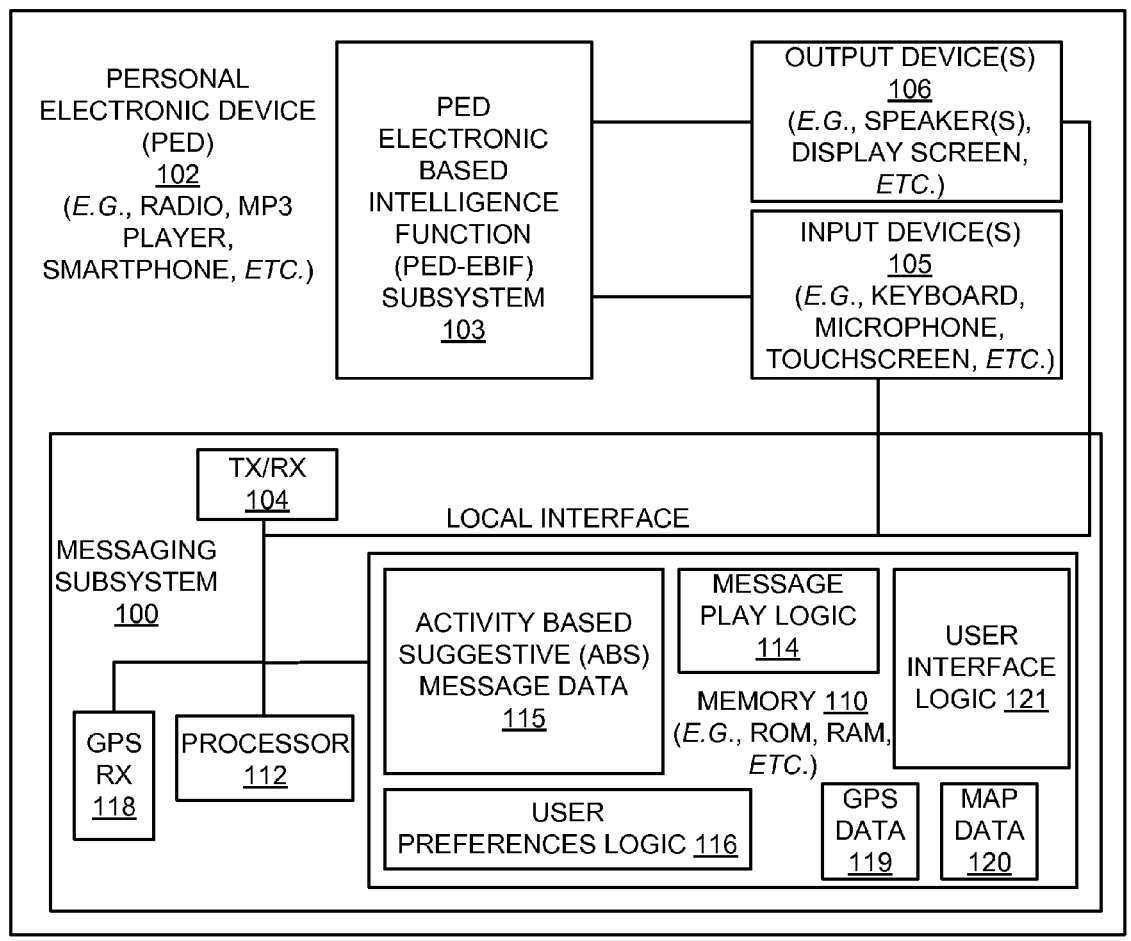
FIG. 1 is a block diagram of an example of a personal communication device (PED) having the messaging subsystem of the present invention for delivering ABS messages.

Referring now to FIG. 1, depicted therein is a personal electronic device (PED) 102 having a messaging subsystem 100 for delivering ABS messages 115 (messages that are, e.g., motivational, inspirational, sales incentizing, meditative, spiritual, instructional, coaching, educational, etc.) to a user. The PED 102 can be, for example but not limited to, a wireless telephone, smartphone, radio, media (CD, DVD, and/or MP3) player, a personal data assistant (PDA), an alarm clock with radio functionality, a personal entertainment device, such as an electronic game machine, a GPS navigator, etc., that has an existing electronic based intelligence function (EBIF) subsystem 103, which is augmented by another EBIF associated with the present invention. Although not limited to this particular architecture, in the preferred embodiment, the PED 102 has a computer-based architecture with one or more processors executing computer program instructions (software) for implementing the EBIFs. In accordance with the present invention, the PED 102 is additionally equipped with a messaging subsystem 100 (an additional EBIF) for delivering one or more ABS messages. Although not limited to this architecture, the EBIF subsystem 103 associated with the PED 102 and the messaging subsystem 100 can share some of the same hardware and/or software for efficiency purposes. In the preferred embodiment, the subsystems 100, 103 share the output device 106 and the processor 112, memory 110, and local interfaces (one or more buses, support circuitry, etc.). Furthermore, as will be clear from the description hereafter, the PED 102 can be designed to permit concurrent or alternating operation of the PED and messaging subsystem functions (first and second EBIFs).

The messaging subsystem 100 includes the components to enable delivery of ABS messages. In particular, messaging subsystem 100 comprises a memory 110, including volatile and/or nonvolatile memory elements, such as RAM, ROM, etc., a processor 112, and message play logic 114 in the memory 110 for managing the playing of the ABS messages on one or more output devices 106. The ABS message(s) 115 can be stored locally in the memory 110 and/or can be accessed from a remote computer via a suitable transceiver (TX/RX) 104 and supporting communication software. In some embodiments, depending upon the type of PED 102, the messaging subsystem 100 will have access to GPS data 119 (detected by GPS receiver 118) and/or map data 120 (onboard and perhaps downloaded from a remote computer), which can be used, as will be described later, to make intelligent decisions on the types of ABS messages that are selected. In yet other embodiments, the messaging subsystem 100 may include user preferences logic 116 in software that enables a user to define when and how an ABS message is delivered. In still other embodiments, the messaging subsystem 100 may include user interface logic 121 (including, for example, a graphical user interface (GUI), voice recognition software, etc.) in software that enables a user to easily input the user preferences.

The message play logic 114 can be implemented in software and/or hardware, but in the preferred embodiment, the message play logic 114 is implemented as software that is stored in the memory 110 and executed by the processor 112. The message play logic 114 (as well as the other software and software logic described in this document), which comprises an ordered listing of executable instructions for implementing logical functions, can be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable medium" can be any means that can contain or store the program for use by or in connection with the instruction execution system, apparatus, or device. The non-transitory computer readable medium can be, for example but not limited to, an electronic, magnetic, optical, electromagnetic, infrared, or semiconductor system, apparatus, or device. More specific examples (a non-exhaustive list)

of the non-transitory computer-readable medium would include the following: a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) or DVD (optical).

When the PED 102 is a device that can output audio (such as music), video, or images, the message play logic 114 can be configured to cause the ABS messages to be provided between audio tracks, video tracks, or images, or alternatively, concurrently during a audio track, video track, or image. In a configuration when an ABS message is played between tracks, the messaging subsystem 100 exchanges information with the PED electronic based intelligence function PED-EBIF) subsystem 103. The messaging subsystem 100 receives track monitoring information from the PED-EBIF subsystem 103 so that the messaging subsystem 100 can schedule an ABS message. The messaging subsystem also communicates requests to the PED-EBIF for control over the output device 106 and supporting hardware/software.

When an ABS message is played concurrently with an audio or video track with an audio track, the message play logic 114 can be designed with logic to cause the volume associated with the audio to be lowered while playing the ABS message, so that the ABS message is heard in the background of the primary audio track. This can be accomplished with a direct interface to the appropriate amplifier controllers or control circuits, or by way of instructions communicated from the message play logic 114 to the PED-EBIF subsystem 103.

The mixing of an audio signal (e.g., music) and the ABS message signal so that the audio and ABS message are played concurrently on the same one or more speakers 106 can be accomplished with a variety of circuits and/or techniques. As examples, the following U.S. patents/publications illustrate and describe circuits that can be used for mixing the signals with precision: U.S. patent application 2003/0059067, U.S. patent application 2007/0286426, and U.S. Pat. No. 7,283,634, all of the foregoing of which are incorporated herein by reference in their entireties.

When the PED 102 is a device that can render display images on a display screen 106, the message play logic 114 can be configured with logic to cause the graphical and/or text ABS messages to be displayed on the screen 106, concurrently with existing images or video associated with the existing EBIF, between such images or video tracks, or instead of such images or video. The ABS message can also be rendered as a watermark type image on the display screen.

The PED 102 may have one or more input devices 105. The input devices 105 may include one or more of the following: a keyboard, touchpad, touchscreen, transducer for sensing an environmental condition and converting it into an electrical signal for analysis, etc. The user can input or otherwise select user preferences with the one or more input devices 105.

The PED 102 may have one or more output devices 106. The output devices 106 may include one or more of the following: a speaker, a display screen, etc. The ABS message data 115 can be an audio signal, video signal, image, and combinations thereof.

The processor 112 in conjunction with the memory 114 and the message play logic 114 are used to play ABS messages 115, for example, voice based ABS messages, and in some embodiments, based upon user preferences that can be defined by a user. The ABS message data 115 can be stored in, for example but not limited to, a Microsoft compatible .wav file formats, in jpeg (.JPG) format, MP3 formats, etc.

User Preferences

Although not necessary for many of the embodiments disclosed herein, in some of the embodiments, the PED 102 is equipped with user preferences logic 116, as illustrated in FIG. 1, in the form of software, for enabling a user to input via input device(s) 105 and store via memory 110 one or more user preferences that can be used to define if and/or when an ABS message is delivered to the output device(s) 106.

Figure 2:
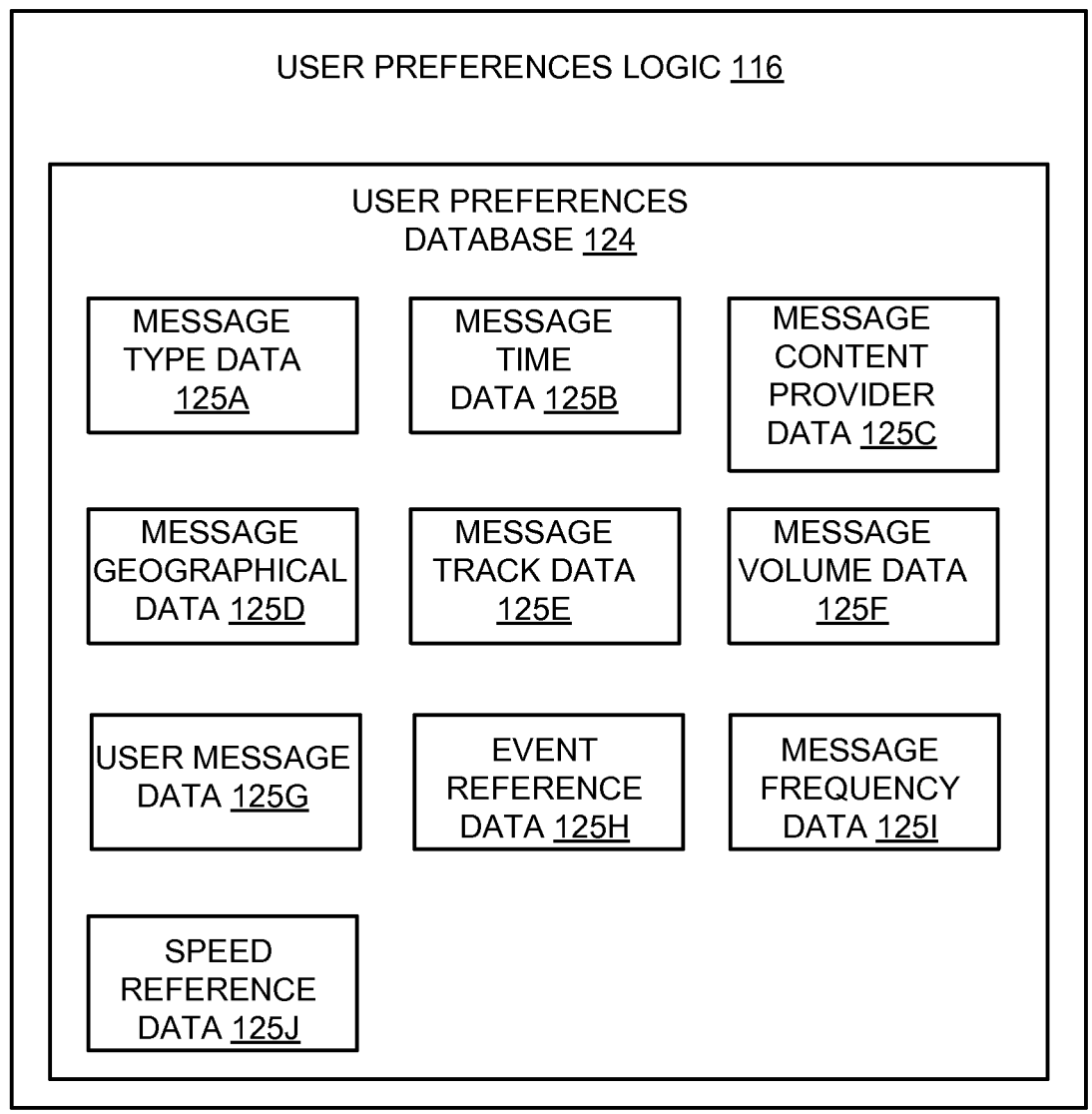
FIG. 2 is a block diagram of an example of user preferences logic associated with the messaging subsystem of FIG. 1.

As shown in FIG. 2, the user preferences logic 116 can include a user preferences database 124 (preferably, relational), lookup tables, or some other suitable data organization scheme, many of which are known in the art, that stores inputted user preferences as user preferences data. The user preferences data can include, as nonlimiting examples, one or more of the following: type data 125A, time data 125B, content provider data 125C, message geographical data 125D, message track data 125E, message volume level data 125F, user message data 125G, event reference data 125H, message frequency data 125I, speed reference data 125J, location reference data 125K, etc. The user interface logic 121 can be designed to solicit and receive input(s) from the user to define any or all of the foregoing user preferences via the input device(s) 105 with perhaps assistance from the output device(s) (display screen) 106.

The type data 125A can indicate a type of message that the user wishes to hear or see. Examples include: motivational, spiritual, educational, sport (e.g., skiing, running, etc.), etc.

The time data 125B can indicate, for example, a time or time period when the messages will be initiated, a time or time period when the messages will be blocked, etc.

The content provider data 125C can indicate, for example, the provider of the message content. Examples include a particular company, network, database, person, etc.

The message geographical data 125D can indicate a desire or not to receive geographically based messages, a location and/or change in location that triggers a message, etc. In some embodiments, a suitable message can be produced or selected based upon knowing the user location via the GPS data 119 and/or map data 120. As an example, consider a skier on a ski slope or ski lift at a ski resort. Specific ABS audio ABS messages relating to skiing can be played to ease the user's fears.

The message track data 125E can indicate, for example, a desire to receive or not a message between or during audio, image, and/or video tracks.

The message volume level data 125F can indicate, for example, a desired volume level of an audio and/or video message having an audio track, on a sale or relative to an existing media track.

The user message data 125G can be, for example, one or more messages inputted or selected by the user.

The event reference data 125H can be, for example, any type of data (threshold, numerical array (for example, one, two, or three dimensional), signal level, signal replica, etc.), that will enable detection of an event in the local environment, which will cause initiation of an ABS message. As will be discussed later in this document, one or more transducers can be associated with the PED 102 (onboard or connected) for sensing one or more environmental conditions in order to detect occurrence of an event, that can be used as a trigger for initiating an ABS message. An event can be any change in acoustic, thermal, optical, electromagnetic (EM), chemical, dynamic, wireless, atmospheric, or biometric conditions.

The message frequency data 125I can indicate, for example, how often the ABS message is outputted. The ABS messages can be played periodically or at non-period intervals, as desired.

The speed reference data 125J can indicate, for example, a speed and/or change in speed that triggers an ABS message.

ABS Messages Selected/Input by User

The message play logic 114 of the messaging subsystem 100 may be designed to enable the user to select an ABS message from a set of stored ABS messages or input an ABS message via an input device(s) 105 (with, in some embodiments, assistance from output device(s) 106) that will be outputted to the user, when appropriate. As an example of the latter scenario, the user may speak an appropriate ABS message into a microphone 106, and this ABS message will be stored for play back in ABS message data 115 of memory 110. As another example, a meaningful picture, such as of a son or daughter, can be captured with a PED camera and stored for later play back during a time of user need.

ABS Messages Selected/Communicated by Remote Computer

The messaging subsystem 100 may include a TX/RX 104 with appropriate support circuitry and/or software for enabling the PED 102 to access and download ABS messages from a remote computer system (server). The TX/RX 104 communicates to the remote computer system via one or more networks, which can include one or more of any suitable networks, for example but not limited to, a wireless, wired, analog, digital, packetized, nonpacketized, cellular, Internet, etc. The design of the TX/RX 104 as well as supporting protocol software depends upon the type of network that is used.

Figures 3, 4:
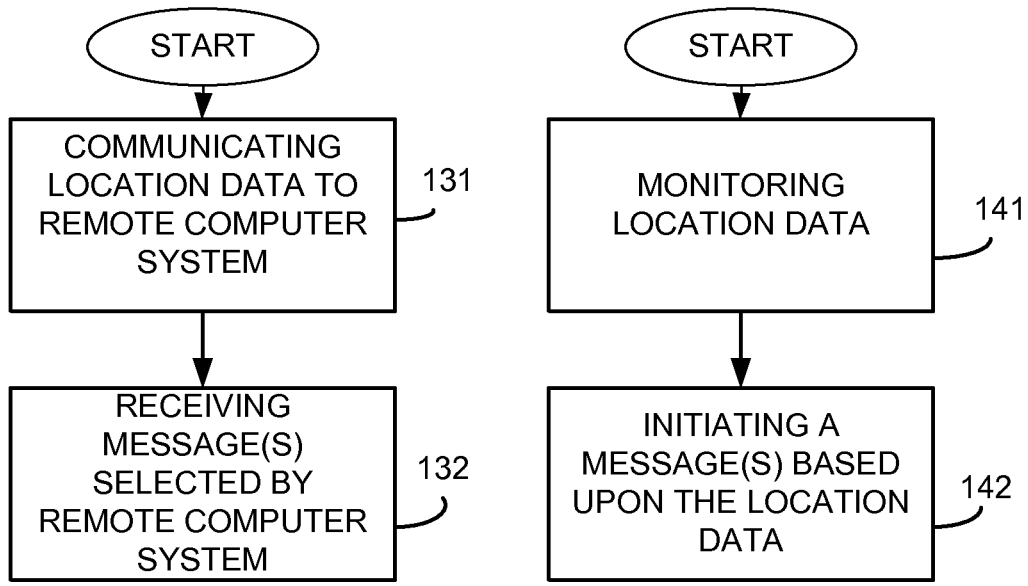
FIG. 3 is a flow chart of an example of remote computer access logic associated with the message play logic in the messaging subsystem of FIG. 1.
FIG. 4 is a flow chart of first example of location based selection logic associated with the message play logic in the messaging subsystem of FIG. 1.

In these embodiments, as shown in FIG. 3, at a high conceptual level, the message play logic 114 has logic 131 for communicating the location data to a remote server computer system, and logic 132 for receiving the ABS message that is selected by the remote server computer system.

Remote ABS Message(s) Selection Based on Location

The message play logic 114 can be designed with logic to play ABS messages based upon the location or change in location of the PED 102. For example, with respect to a runner running up a hill, the message play logic 114 may select an ABS message for that specific context, like "Don't give up." In these possible embodiments, as shown in FIG. 4, the message play logic 114, has logic 141 for monitoring location data associated with the PED 102, and logic 142 for initiating an ABS message based at least in part on the location data.

The logic 141 can track PED locations by accessing the GPS data 119 and/or map data 120. The map data 120 can also include elevation and/or terrain information, so that hills, ski slopes, etc., can be identified.

After the logic 141 forwards the location information to the logic 142, the logic 142 can access the ABS message data 115 corresponding to the location(s) and have it played on an appropriate output device(s) 106. In some embodiments, a simple lookup table or the like is utilized.

ABS Message(s) Selection Based on Activity Status

Figures 5, 6:
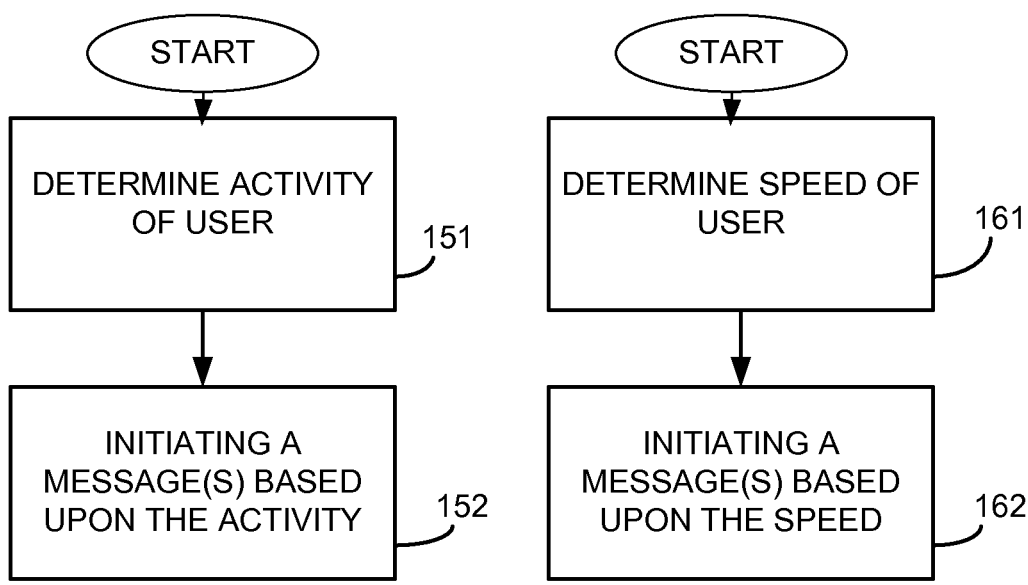
FIG. 5 is a flow chart of an example of activity based selection logic associated with the message play logic in the messaging subsystem of FIG. 1.
FIG. 6 is a flow chart of an example of speed based selection logic associated with the message play logic in the messaging subsystem of FIG. 1.

The message play logic 114 can be designed with logic to play ABS messages based upon the activity associated with a user of the PED 102. In these possible embodiments, as shown in FIG. 5, the message play logic 114 has logic 151 for determining an activity associated with a user of the PED 102, and logic 152 initiating an ABS message based at least in part on the determined activity. Activities can include, for example but not limited to, a sport (e.g., running, skiing, hiking, bicycling, golfing, auto racing, etc.), falling down, riding a ski lift, riding in a motor vehicle, train, or ship, etc.

For example, in the case of a skier having a smartphone with a GPS receiver 118 and map data 120, appropriate ski music and/or skiing ABS message can be selected, such as "Relax" or "Find your center over the skis" or "Watch 50 feet in front and don't look down." The message play logic 114 can determine that a PED user is skiing based upon the GPS data 119, which indicates the current location of the PED 102, and a known location of a ski slope, which can be and is typically included in map data 120.

The activity associated with the user can be determined by analyzing data from one or more transducers 105, or sensors, associated with the PED 102. Non-limiting examples are an accelerometer data, gyroscope data, GPS data 119, map data 120, microphone data, etc. An activity can also be determined based upon detection of an event, which functionality will be described later in this document.

After the logic 151 forwards the activity information to the logic 152, the logic 152 can access the ABS message data 115 corresponding to the activity(s) and have it played on an appropriate output device(s) 106. In some embodiments, a simple lookup table or the like is utilized.

In other embodiments, the message play logic 114 may be designed with logic to play ABS messages when an activity changes or between activities. For example, the message play logic 114 may be designed to monitor a runner on a known running trail with the GPS data 119 and the map data 120, and when the runner walks between running segments, the logic 114 may be designed to play one or more motivational ABS messages.

Another example of an application is in connection with golfing. A PED user walking to a hole may be delivered ABS messages, including reminders or instructions on how to play a particular hole.

ABS Message(s) Selection Based on Speed Status

The message play logic 114 can be designed to play ABS messages based upon the speed or change in speed of the user associated with the PED 102. In these possible embodiments, as shown in FIG. 6, the message play logic 114 has logic 161 for determining the speed or change in speed associated with a user of the PED 102, and logic 162 initiating an ABS message based at least in part on the determined speed or change in speed.

In order to determine speed or a change in speed, the logic 161 can be designed to analyze GPS data 119 in memory 110. The location, change in location, and rate of location change can be directly computer/determined from the GPS data 119.

After the logic 161 communicates the speed information to the logice 162, the logic 162 can be designed to retrieve ABS message data 115 from memory, as appropriate, and, if desired, pursuant to user preferences by accessing speed reference data 125J in user preferences database 124 (FIG. 2), and have it played on an appropriate output device(s) 106. In some embodiments, a simple lookup table or the like is utilized.

As an example, one user preference could be as follows. When the user transitions from a walk pace to a run pace, play an audio ABS message, such as "Go for it. Don't quit. Keep it up." Another example would be if a user is running and starts to walk, an audio ABS message could be outputted, such as "Don't quit running. Start running again. You need to lose weight."

Local ABS Message(s) Selection Based on Location

Figure 7:
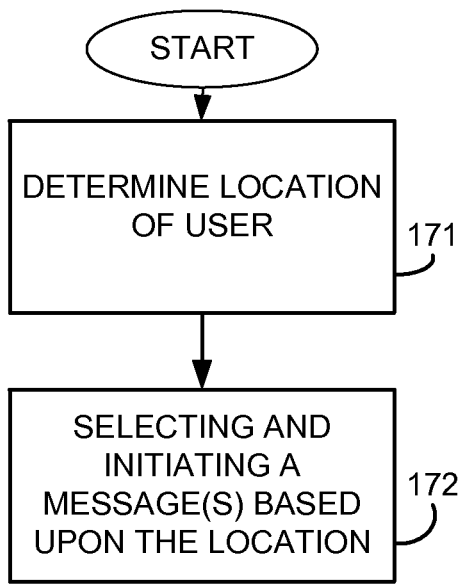
FIG. 7 is a flow chart of a second example of location based selection logic associated with the message play logic in the messaging subsystem of FIG. 1.

The message play logic 114 can be designed to play ABS messages based upon the location or change in location of the user associated with the PED 102. In these possible embodiments, as shown in FIG. 7, the message play logic 114 has logic 171 for determining the location or change in location associated with a user of the PED 102, and logic 172 initiating an ABS message based at least in part on the determined location or change in location. Location can be defined in one, two, or three dimensions. Location can include the elevation of the PED user, so that elevation or elevational changes trigger ABS messages.

In order to determine location or a change in location, the logic 171 can be designed to analyze GPS data 119 and/or map data 120 in memory 110. The location and change in location can be directly computed/determined from the GPS data 119 and/or map data 120.

After the logic 171 communicates the location information to the logic 172, the logic 172 can be designed to retrieve message data 115 from memory 110, as appropriate, and, if desired, pursuant to user preferences by accessing message geographical data 125D in user preferences database 124 (FIG. 2),), and have it played on an appropriate output device(s) 106. In some embodiments, a simple lookup table or the like is utilized.

As an example, the user may predefine a user preference (message geographical data 125D of FIG. 2) to the effect that when the user enters a dangerous neighborhood, an ABS message should be communicated to the user, such as an audio ABS message saying "Do not fear. God is with you."

As another example, a PED user in an airplane may be played an ABS message to calm fears when in flight or during landing.

ABS Message(s) Selection Based on Detected Event

Figure 8:
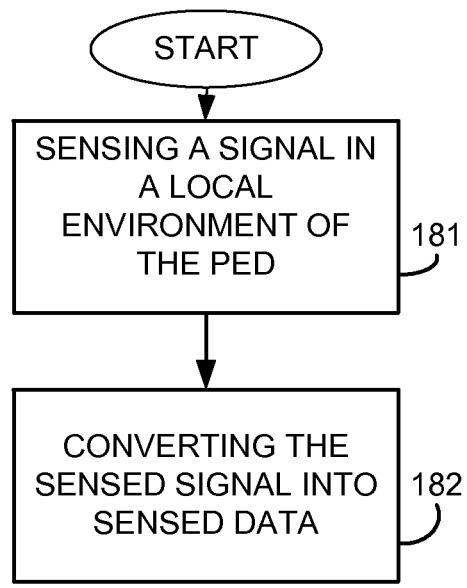
FIG. 8 is a flow chart of an example event based selection logic associated with the message play logic in the messaging subsystem of FIG. 1.
Figure 8:
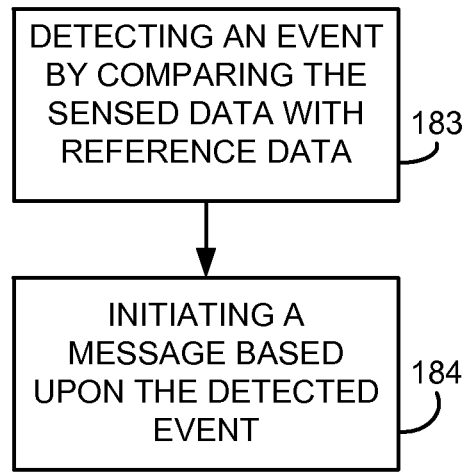

The message play logic 114 can be designed to play ABS messages on one or more output devices 106 based upon an event that is detected in the local environment of the PED 102. In these possible embodiments, as shown in FIG. 8, the message play logic 114 (FIG. 1) has logic 181 designed to sense a signal in a local environment associated with the PED 102; logic 182 designed to convert the sensed signal to data; logic 183 designed to detect an event by comparing the sensed data with reference data that corresponds to the event; and logic 184 designed to initiate output of the one or more ABS messages based upon the detected event to the one or more output devices 106 (FIG. 1).

As an example, the message play logic 114 may be designed to detect that storm thunder has occurred and provide an encouraging audio ABS message to the user via a speaker 106, for example, "Don't be afraid" or "Don't worry, God will protect you."

In some embodiments, the message play logic 114 may be designed with logic for storing identification information relating to a plurality of events and with logic for enabling the user to select which of the events will be detected.

Figure 9:
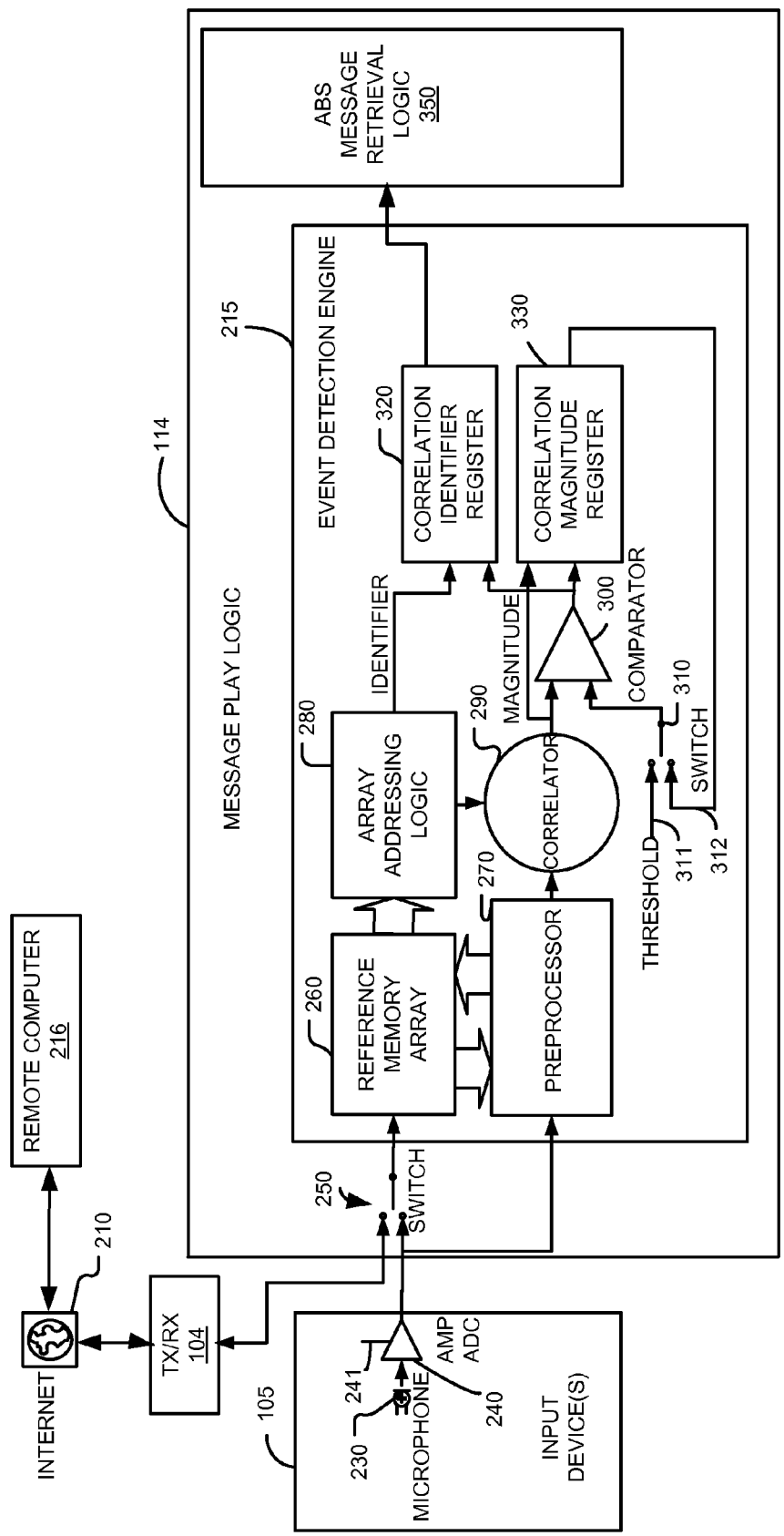
FIG. 9 is a block diagram of an example of an event detection engine that can be used in connection with the event based selection logic of FIG. 8.

The message play logic 114 is designed to include a detection engine 215, which detects events in the local environment of the PED 102, and message retrieval logic 350, which retrieves one or more ABS messages from ABS message data 115 based upon event detection. FIG. 9 shows the one or more input devices 105, such as but not limited to, an audio microphone 130 as shown, etc., for receiving one or more event reference signatures (event reference data 125H of FIG. 2) that are used to identify environmental events. The input devices 105 can include any transducer for sensing acoustic, thermal, optical, electromagnetic, chemical, dynamic, wireless, atmospheric, or biometric conditions (e.g., a body function, such as blood pressure, body temperature, heart rate, sugar level, heart beat, oxygen level, etc.), for example but not limited to, an audio microphone, video camera, Hall Effect magnetic field detector, flux gate compass, electromagnetic field detector, accelerometer, barometric pressure sensor, thermometer, ionization detector, smoke detector, gaseous detector, radiation detector, biometric sensor, etc. The detection engine 215 may also receive reference signatures from a remote computer 216 via the Internet 210.

The detection engine 215 stores the one or more reference signatures in memory 110 (event reference data 125H of FIG. 2) that are used to identify environmental events, that correlates sensed environmental signals with the reference signatures, and that detects occurrences of the environmental events. A non-limiting example of such a detection engine 215 is described in U.S. Pat. No. 7,872,574, which is incorporated herein by reference in its entirety. The discussion hereafter will describe incorporation of the latter detection engine 215 in the architecture of the present invention.

The event detection engine 215 is designed to be operated in several modes. The architecture of the event detection engine 215 will be described as each of these modes is described in detail hereafter.

First Mode

In a first mode, the remote computer 216 is connected to a reference memory array 260 by a switch 250. One or more reference signatures are collected by the remote computer 216 and loaded into the reference memory array 260.

Reference signatures, such as storm thunder, emergency signals, etc. can be collected from the remote computer 216.

In this example, when an audio event is being detected, the event detection engine 215 is designed to transform audio recordings into suitable numerical arrays to create the reference signatures for recognition. The frequency range of 0.2 Hz to 20 KHz is sufficient for storm thunder applications. Furthermore, a time interval of several seconds is normally sufficient.

The preprocessor 270 extracts the reference signals from the reference memory array 260 and reformats them to facilitate rapid correlation. The frequency domain is a preferred format for sonograms. The preprocessor 270 analyzes each signature by a sequence of Fourier transforms taken repeatedly over a period of time corresponding to the duration of the signature. The Fourier transform is preferably a two-dimensional vector, but a single measure of amplitude versus frequency is sufficient. In the preferred embodiment, among many possible embodiments, the event detection engine 215 processes a 3-dimensional array of amplitude, frequency, and time. The transformed signature arrays are stored back into a reference memory array 260 for subsequent rapid correlation. Preferably, each reference signature array includes an identifier field associated with the signature. As an example, for a storm thunder identification, this may be the name and picture/image of a lightning bolt or storm cloud associated with the signature. Or, in the case of an emergency signal, the identifier can simply be an indication of the type of emergency, for instance, a police siren. Furthermore, the emergency identifier can also indicate an appropriate evasive or corrective action.

Second Mode

In a second mode of operation, event detection engine 215 can acquire the reference signature signal directly from the local environment via an input device 105, for example, the audio microphone 230, as shown in FIG. 9. Audio signals from the microphone 230 are amplified and converted to digital signals by amplifier and analog-to-digital converter (ADC) 240. The digital signal from amplifier and ADC 240 is selected by the user via the switch 250 and loaded directly into the reference memory array 260. Preferably, several seconds of signal are collected in this particular application. Then, the preprocessor 270 reformats the reference signal for rapid correlation, preferably by Fourier transform.

A gain control 241 associated with the ADC 240 can be controlled by the user to control the range of the microphone 230 (or another input device, if applicable, and depending upon the application).

Third Mode

In a third mode of operation, the event detection engine 215 monitors the environment continuously (at discrete successive short time intervals due to the computer-based architecture) for signals that match those stored in the reference memory array 260. To reduce computational burden, the preprocessor 270 is designed to monitor the microphone 230 for a preset threshold level of signal before beginning the correlation process. When the signal exceeds the preset threshold level, the preprocessor 270 begins executing a Fourier transform. After several seconds or a period equal to the period of the reference signatures, the transformed active signal is stored at the output of the preprocessor 270. Then, array addressing logic 280 begins selecting one reference signature at a time for correlation. Each reference signature is correlated by a correlator 290 with the active signal to determine if the reference signature matches the active signal from the environment.

The comparator 300 compares the magnitude of the output of the correlator 290 with a threshold to determine a match. When searching for events in the active signal, such as emergency signals, the correlator 290 is compared with a fixed threshold. In this case, the switch 310 selects a fixed threshold 311 for comparison. If the correlation magnitude exceeds the fixed threshold 311, then the comparator 300 has detected a match. The comparator 300 then activates the correlation identifier register 320 and the correlation magnitude register 330. The magnitude of the comparison result is stored in the correlation magnitude register 330, and the identity of the source is stored in the correlation identifier register 320. The fixed threshold 311 can be predefined by a programmer or the user of the PED 102.

After event detection by the event detection engine 215, the process is stopped and the array addressing logic 280 is reset. A search for new active signals then resumes.

Fourth Mode

In a fourth mode of operation, the event detection engine 215 searches for the best match for the sensed signal. In this case, the correlation magnitude register 330 is first cleared. Then, the switch 310 selects the output 312 of the correlation magnitude register 330 as the threshold input to the comparator 300. The array addressing logic 280 then sequentially selects all stored references of a set for correlation. After each reference in the set is correlated, the comparator 300 compares the result with previous correlations stored in the correlation magnitude register 330. If the new correlation magnitude is higher, then the new correlation magnitude is loaded into the correlation magnitude register 330, and the respective identifier is loaded into the correlation identifier register 320.

In an alternative embodiment, the correlation process can be performed by an associative process, where the active reference is associated directly with the stored references in a parallel operation that is faster than the sequential operation. New device technologies may enable associative processing. For example, reference memory array 260 can utilize content addressable memory devices for associative processing. ASIC devices and devices, such as the Texas Instruments TNETX3151 Ethernet switch incorporate content addressable memory. U.S. Pat. No. 5,216,541, entitled "Optical Associative Identifier with Joint Transform Correlator," which is incorporated herein by reference, describes optical associative correlation.

This correlation process continues until all stored reference signatures in the set under analysis have been correlated. When the correlation process is completed, the correlation identifier register 320 holds the best match of the identity of the source of the active signal. The message retrieval logic 350 reads this register 320 and then selects and retrieves the appropriate ABS message from ABS message data 115 in memory 110, and then has the ABS message forwarded to the appropriate output device(s) 106. In addition, the identity of the event can also be displayed as a photo or text description in a display 106 or as a verbal announcement via a speaker 106. If the final correlation magnitude is lower than a predetermined threshold, then the active signature can be loaded into the reference memory array 260 as a new unknown source.

Two or more PEDs 102 can function cooperatively to provide sensory enhancement over a wider range than that covered by a single PED 102 in order to better detect one or more events occurring in the environment. Multiple cooperating PEDs 102 can simultaneously monitor for selected environmental events, and exchange information pertaining to the events. Detection of an event could occur in one PED 102 and then this PED 102 could communicate that information to another PED 102, which delivers the ABS message. In another scenario, a PED 102 may receive partial information, such as correlation information, from another PED 102 and then make a decision on event detection based upon information from a local transducer as well as the partial information from the other PED 102.

VARIATIONS, MODIFICATIONS, AND OTHER POSSIBLE APPLICATIONS

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

With respect to variations, note that although not specifically described for simplicity, any combination of the various systems/methods that have been described under headings above may be implemented.

As an example of an application, a radio may be outfitted in accordance with the present invention to be used in the sales and spiritual products marketplaces. Such a radio, for example, can now be configured to automatically play a new, unique pre-recorded, digital ABS message of a predefined duration, say 5-10 minutes, for example, every day of the year. Such ABS messages can be recorded by world-renowned experts in the fields of sales and spirituality.

As another example of an application, each morning when a user either wakes from sleep (such as a result of clock radio initiating manifestation of a radio broadcast) or gets into a shower stall where a shower radio is in operation, the user can be presented with a meditative/spiritual/sales ABS message.

As another example of a variation, note that the comparing process that is performed by the event detection engine 215 in order to detect an environmental event associated with a PED 102 can be performed in the time domain as opposed to the frequency domain, and in some cases, this may be the preferred methodology.

At least the following is claimed:

1. A method for delivering messages in a personal electronic device (PED), comprising:
    enabling a user to input one or more user preferences associated with one or more activity based suggestive (ABS) messages, the one or more user preferences defining at least one selection condition for selection of the one or more ABS messages and at least one output condition for output of the one or more ABS messages;
    playing media from the PED;
    determining a user activity associated with the user;
    selecting an ABS message from among the one or more ABS messages based on the at least one selection condition and the user activity; and
    in response to the user activity meeting the at least one output condition, initiating output of the ABS message from the PED.

2. The method of claim 1, further comprising:
    determining that an event has occurred in a local environment associated with the PED by analyzing data measured by one or more transducers situated in or communicatively coupled to the PED;
    determining the user activity based at least in part on the event; and
    selecting the ABS message from among the one or more ABS messages based on the at least one selection condition, the user activity, and the event.

3. The method of claim 1, further comprising:
    determining that an event has occurred in a local environment associated with the PED by analyzing data measured by one or more transducers situated in or communicatively coupled to the PED; and
    initiating output of the ABS message from the PED in response to at least one of the user activity and the event meeting the at least one output condition.

4. The method of claim 1, wherein the PED includes a user interface having a keyboard and display that enables the user to select or input the user preferences.

5. The method of claim 1, wherein the one or more ABS messages are input by the user.

6. The method of claim 1, wherein the one or more ABS messages are provided between audio tracks played from the PED.

7. The method of claim 1, wherein the one or more ABS messages are provided during an audio track played from the PED.

8. The method of claim 7, further comprising lowering a volume associated with the audio track played from the PED while playing the one or more ABS messages.

9. The method of claim 1, further comprising accessing a remote computer server and retrieving the one or more ABS messages.

10. The method of claim 1, further comprising:
    monitoring location data associated with the PED;
    selecting the ABS message from among the one or more ABS messages based on the at least one selection condition, the user activity, and the location data; and
    initiating output of the ABS message in response to at least one of the user activity and the location data meeting the at least one output condition.

11. The method of claim 10, further comprising:
    communicating the location data to a remote server computer system; and
    receiving the one or more ABS messages from the remote server computer system based on the location data.

12. The method of claim 1, further comprising mixing an audio signal and the ABS message so that the audio signal and the ABS message are played concurrently.

13. The method of claim 1, further comprising:
    determining an event associated with the PED;
    selecting the ABS message from among the one or more ABS messages based on the at least one selection condition, the user activity, and the event; and
    initiating output of the ABS message in response to at least one of the user activity and the event meeting the at least one output condition.

14. The method of claim 1, further comprising:
    detecting a speed associated with the PED; and
    selecting the ABS message from among the one or more ABS messages based further on the speed.

15. The method of claim 14, further comprising:
    determining a location associated with the PED; and
    selecting the ABS message from among the one or more ABS messages based further on the location and the speed.

16. A method for delivering messages in a personal electronic device (PED), comprising:
    enabling a user to perform a first electronic based intelligence function including playing media from the PED; and
    enabling the user to perform a second electronic based intelligence function, comprising:
        enabling the user to input one or more user preferences associated with one or more activity based suggestive (ABS) messages, the one or more user preferences defining at least one selection condition for selection of the one or more ABS messages and at least one output condition for output of the one or more ABS messages;
        determining an activity associated with the PED;
        selecting an ABS message from among the one or more ABS messages based on the at least one selection condition and the activity associated with the PED; and
        initiating output of the ABS message from the PED in response to the activity associated with the PED meeting the at least one output condition.

17. The method of claim 16, further comprising permitting concurrent operation of the first and second electronic based intelligence functions.

18. A method for delivering messages in a personal electronic device (PED) having a GPS receiver and storing map data, comprising:
    performing, with the PED, a first electronic based intelligence function; and
    performing, with the PED, a second electronic based intelligence function, comprising:
        receiving one or more conditions for output of one or more activity based suggestive (ABS) messages, the one or more conditions including at least one selection condition for selection of the one or more ABS messages and at least one output condition for output of the one or more ABS messages;
        receiving location information from the GPS receiver;
        determining an activity status for the PED based on upon the location information and the map data;

selecting an ABS message from among the one or more ABS messages based on the at least one selection condition and the activity status; and initiating output of the ABS message from the PED in response to the activity status of the PED meeting the at least one output condition.

19. The method of claim 18, further comprising:

determining that an event has occurred in a local environment associated with the PED by analyzing data measured by one or more transducers situated in or communicatively coupled to the PED; and selecting the ABS message from among the one or more ABS messages based on the activity status and the event.

20. The method of claim 18, further comprising:

communicating the location information to a remote computer system; and receiving the one or more ABS messages from the remote computer system based on the location information.

21. The method of claim 18, wherein the activity status includes at least one of an activity commenced status, an activity terminated status, or an activity changed status.

22. A method for delivering messages in a personal electronic device (PED), comprising:

performing, with the PED, a first electronic based intelligence function; and performing, with the PED, a second electronic based intelligence function, comprising:

receiving conditions associated with one or more messages, the conditions including a selection condition and an output condition;

sensing a signal in a local environment associated with the PED;

converting the signal to sensed data;

detecting an event, at least in part, by comparing the sensed data with reference data that corresponds to the event;

selecting a message from among the one or more messages based on the at least one selection condition and the event; and initiating output of the message from the PED in response to the event meeting the output condition.

23. The method of claim 22, further comprising:

storing identification information relating to a plurality of events; and enabling a user to select the event from the identification information.

24. The method of claim 22, further comprising:

determining location information associated with the PED; and using the location information to assist with detecting the event.

25. The method of claim 22, further comprising:

determining a user activity associated with the PED; and selecting the message based on the selection condition, the event, and the user activity.

26. The method of claim 22, further comprising concurrently outputting media and the message from the PED.

27. The method of claim 26, wherein the media comprises an audio signal and the method further comprises adjusting a volume associated with the message so that the volume is lower than that associated with an audio signal associated with the media.

28. The method of claim 22, further comprising outputting the message between tracks of media played by the PED.

* * * * *